F. JOHNSON.
PUMP.
APPLICATION FILED SEPT. 11, 1920.
1,378,543.
Patented May 17, 1921.
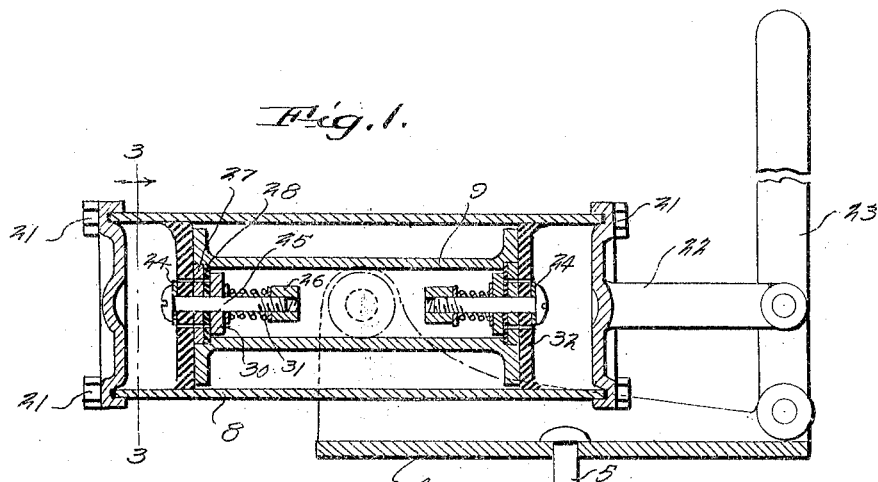
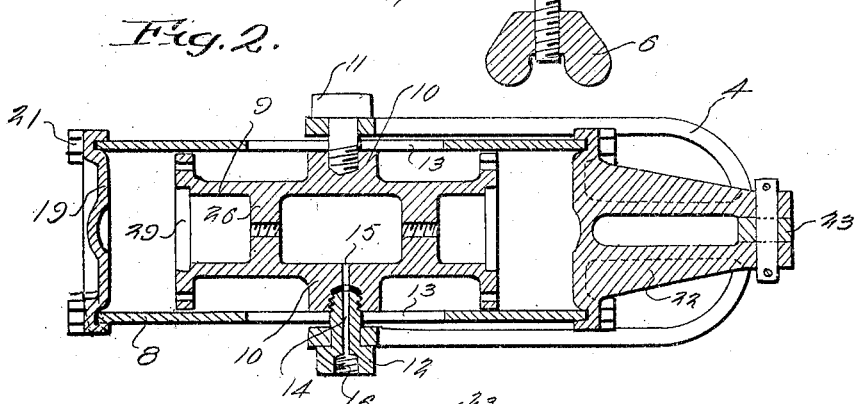
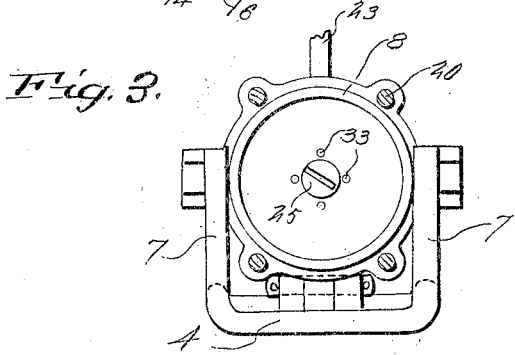
WITNESSES
Gerald Hennesy
B. F. Garvey
INVENTOR.
Frank Johnson
BY
Richard B. Owen
ATTORNEY.

UNITED STATES PATENT OFFICE.

FRANK JOHNSON, OF AURORA, ILLINOIS.

PUMP.

1,378,543. Specification of Letters Patent. Patented May 17, 1921.

Application filed September 11, 1920. Serial No. 409,512.

*To all whom it may concern:*

Be it known that I, FRANK JOHNSON, a citizen of the United States, residing at Aurora, in the county of Kane and State of Illinois, have invented certain new and useful Improvements in Pumps, of which the following is a specification.

This invention relates to pumps and has primarily for an object the provision of a device especially adapted for use on motor vehicles, to inflate the tires of the latter.

Another object of the invention is to provide a pump which may be fixedly carried by the running board, the spokes of the wheel, or other desired part of the vehicle to securely anchor the pump while using the same.

The above and other objects of this invention will be in part described and in part understood from the following description of the present preferred embodiment of the invention taken in connection with the accompanying drawings, wherein:

Figure 1, is a vertical sectional view of a pump constructed in accordance with this invention.

Fig. 2, is a horizontal sectional view thereof showing parts removed, and

Fig. 3, is a sectional view taken on the line 3—3 of Fig. 1, and looking in the direction of the arrow.

The device consists of a base 4 of any desired configuration, which has depending therefrom a bolt 5, upon which is mounted a thumb nut 6. The bolt is adapted for engagement with an object for anchoring the pump, such for instance, as the running board of the vehicle. The opposite margins of the base are turned upwardly at right angles to provide arms 7.

A cylinder 8 is mounted upon the base and slidably incases a piston 9. The piston 9 is tubular and is provided with enlargements 10 on diametrically opposite sides thereof. These enlargements are adapted for the reception of a screw bolt 11 on one side and a screw bolt 12 on the opposite side. The shanks of these bolts extend through longitudinal slots 13 in the opposite sides of the cylinder. The bolt 12 is provided with a central bore 14, which communicates with a passage-way 15 formed in the enlargement 10 with which it is engaged. The outer end of said bolt is enlarged and screw threaded as indicated at 16 to receive the screw threaded nipple of an air conducting hose. The opposite end of the hose extends to the tire that is being inflated.

The opposite ends of the cylinder are closed by heads 17 which are secured by tie-bolts 20. The said tie-bolts extend through peripheral ears on said heads and receive nuts 21. One of the heads has an enlargement 22 formed thereon which is bifurcated. A lever 23 is mounted between and pivotally engaged with the branches of the bifurcation. One end of said lever is pivotally engaged with the base 4, while the opposite end extends appreciably thereabove to give ample leverage for operating the cylinder. As is obvious movement of the lever in the arc of a circle will cause the cylinder to be likewise moved, since the piston 9 is held fixed by the bolts 11 and 12, which extend through the upstanding arms 7.

The piston is hollow throughout its length and has the opposite ends thereof open. These ends are normally closed by valves generally designated 24. Each valve consists of a bolt 25 screw threaded in a bearing 26 arranged transversely across the piston. The bolt has mounted thereon a metal washer 27 and a fabric or rubber washer 28 which are mounted in an annular recess 29 formed in the piston and comprising a valve seat. Of course, the opposite end of the piston is formed in a like manner. The bolt is further provided with a washer 30 which is held in place by one end of a coil spring 31, the opposite end of the latter being engaged with the bearing 26. A packing disk 32 is engaged with each bolt 25 and secured over the ends of the piston. The outer peripheries of these disks are snugly engaged with the inner periphery of the cylinder 8.

In operation it will be apparent that movement of the cylinder 8 in one direction will cause an influx of air through one of the check valves by passing through openings 33 formed in the latter. As the air passes through said openings impact of the same with the washer 30, causes the latter to be unseated, permitting the air to pass into the piston. During this cycle of movement the opposite valve is held in a closed position by its spring 31. Consequently, the pump is double acting, thereby causing a large influx of air into the piston which will be passed through the passage-way 15, and the bolt 12, into the air hose.

Although I have described this device as being manually operable, it is nevertheless to be understood that the same could be mechanically operated by resorting to obvious mechanical expedients. Moreover, it is to be understood that this device may be anchored on any part of the machine, eliminating the undesirability of holding the pump in place under foot pressure.

What is claimed is:

An air pump including a base having upstanding arms, a cylinder mounted between said arms and provided with longitudinal slots, bolts extending through said arms and slots for supporting the cylinder, a piston mounted within the cylinder and engaged by said bolts whereby longitudinal movement of the piston is prevented, check valves mounted on the opposite ends of said piston to permit alternate ingress of air through said valves upon movement of the cylinder, one of said bolts having a central bore communicating with the piston to withdraw the air from the latter.

In testimony whereof, I affix my signature in presence of two witnesses.

FRANK JOHNSON.

Witnesses:
 WALTER STEVENS,
 GEO. W. IGO.